United States Patent
Ferber et al.

(10) Patent No.: US 6,923,247 B1
(45) Date of Patent: Aug. 2, 2005

(54) COOLED COMPONENTS WITH CONICAL COOLING PASSAGES

(75) Inventors: Jörgen Ferber, Küssaberg (DE); Bernhard Weigand, Lauchringen (DE)

(73) Assignee: Alstom, Paris (FR)

( * ) Notice: Subject to any disclaimer, the term of this patent is extended or adjusted under 35 U.S.C. 154(b) by 615 days.

(21) Appl. No.: 09/431,178

(22) Filed: Nov. 1, 1999

(30) Foreign Application Priority Data

Nov. 9, 1998 (EP) ............................... 98811114

(51) Int. Cl.[7] ............................. F01D 5/08; F01D 5/18; B64C 11/24

(52) U.S. Cl. ...................... 165/47; 165/168; 416/96 R; 415/115; 415/116; 29/889.721

(58) Field of Search .................. 165/47, 168, 169; 416/97 R, 95, 96 R; 29/889.721; 415/115, 116, 175, 176, 191; 60/39.83

(56) References Cited

U.S. PATENT DOCUMENTS

| | | | |
|---|---|---|---|
| 3,527,543 A | | 9/1970 | Howald |
| 3,700,418 A | * | 10/1972 | Mayeda ............. 29/889.721 X |
| 3,806,274 A | * | 4/1974 | Moore ...................... 416/97 R |
| 4,314,442 A | * | 2/1982 | Rice ....................... 60/39.83 X |
| 4,726,735 A | * | 2/1988 | Field et al. ............... 416/97 R |
| 4,737,613 A | | 4/1988 | Frye |
| 4,818,834 A | | 4/1989 | Rupert |
| 5,096,379 A | * | 3/1992 | Stroud et al. ............. 416/97 R |
| 5,192,192 A | * | 3/1993 | Ourhaan .................... 416/97 R |
| 5,232,343 A | * | 8/1993 | Butts ........................ 416/97 R |
| 5,326,224 A | * | 7/1994 | Lee et al. ................. 416/97 R |
| 5,356,265 A | * | 10/1994 | Kercher .................... 416/97 R |
| 5,690,473 A | * | 11/1997 | Kercher ................. 415/115 X |
| 5,779,437 A | * | 7/1998 | Abdel-Messeh et al. .... 415/115 |
| 6,082,961 A | * | 7/2000 | Anderson et al. ........... 415/115 |
| 6,224,336 B1 | * | 5/2001 | Kercher ................. 415/115 X |
| 6,273,682 B1 | * | 8/2001 | Lee ....................... 416/96 R X |

FOREIGN PATENT DOCUMENTS

| | | |
|---|---|---|
| EP | 0287267 A2 | 10/1988 |
| EP | 0648918 B1 | 4/1995 |

* cited by examiner

Primary Examiner—Ljiljana Ciric
(74) Attorney, Agent, or Firm—Burns, Doane, Swecker & Mathis, LLP

(57) ABSTRACT

A thermally highly loaded machine component (10), which is protected from overheating by film cooling, is provided with conical cooling passages (30) of circular cross section. The cooling passages are designed so as to be divergent from the cold-gas side (13) toward the hot-gas side. The conical cooling passages, as compared with cylindrical passages with regard to the mass flow of cooling medium (35) fed through the cooling passages, are substantially less dependent on the pressure ratio between the cold-gas side (13) and hot-gas side (14) of the component. The straight conical cooling passages of round cross section throughout may be produced in a very simple manner by laser drilling, with a convergent cutting beam being used for the machining.

1 Claim, 4 Drawing Sheets

COOLED COMPONENTS WITH CONICAL COOLING PASSAGES

BACKGROUND OF THE INVENTION

1. Field of the Invention

The invention relates to a component which can be subjected to high thermal loading and to which a hot-gas flow is admitted during operation, which component has at least one hot-gas side exposed to the hot-gas flow and a cold-gas side not exposed to the hot-gas flow, in which component passages are made, which passages connect the hot-gas side and the cold-gas side in such a way that a cooling medium flows from the cold-gas side to the hot-gas side, which cooling medium, when passing through a passage, absorbs heat from the component and draws it off to the hot-gas side, at least one of the cooling passages having an essentially circular cross section over its entire length, which cross section increases continuously from the cold-gas side to the hot-gas side, an opening half angle being enclosed, so that the at least one passage appears frusto-conical.

2. Discussion of Background

In modern technology it is often the case that a medium flows around or over a component, the temperature of which medium far exceeds the maximum component temperature permitted in the interests of operational safety. Examples which may be mentioned are the conditions in the interior of gas-turbine combustion chambers and in their first turbine stages. Here, there is also a highly turbulent flow around the component, and this flow further intensifies the heat transfer. At the hot-gas temperatures achieved nowadays in the interest of high efficiency, the limits of the simple component cooling with a heat dissipation through the component are far exceeded.

Methods in which the direct contact of the components to be cooled with the hot-gas flow is prevented from the outset prove to be substantially more suitable. In the film cooling, which is common in gas-turbine construction, cooling medium—generally compressor air—is admitted to the component to be cooled on a side over which the hot gas does not flow, this side in the case of components around which flow occurs, such as blades, being the interior of said components. The cold-gas side and the hot-gas side are connected to one another by a multiplicity of passages, which as far as possible open out tangentially to the hot-gas flow on the hot-gas side. In this way, a layer of cool medium is applied to the component, this layer preventing the direct contact of component and hot-gas flow.

The so-called "showerhead cooling" represents a special form. This "showerhead cooling" is used in particular at locations where the hot-gas flow strikes the component to be cooled approximately perpendicularly. In this case, it is actually impossible to have the cooling passage open out tangentially to the main flow and thus form an effective cooling film. On the other hand, the cooling medium is directed at a comparatively steep angle to the component surface; the cooling medium absorbs heat from the highly loaded component while flowing through the cooling passage. The cooling medium is also successively brought into contact again with the component by the incident flow, so that this cooling method combines features of convective cooling with those of film cooling.

The cooling passages must be produced within relatively close tolerances for several reasons. On the one hand, compressor air is usually used as the cooling medium. The result of this is that, especially in the first turbine stages, which are subjected to extremely high thermal loading, only a small driving pressure gradient is available for the outflow of the cooling medium, especially at locations which are directly subjected to the free hot-gas flow, and at which stagnation points of the hot-gas flow form, thus in particular at the leading edge of the first blades of the first guide row. If there is not enough cooling air coming through the cooling passages, the cooling collapses. On the other hand, if too much cooling air is extracted from the cyclic process, this has adverse effects on the efficiency of the machine from the outset.

With regard to the throughflow, conventional cooling passages of constant cross section, in particular at low pressure ratios, are dependent on the pressure ratio to an extremely pronounced extent: the results of experimental tests show that the flow coefficient $c_d$, which depicts the ratio of the mass flow actually fed through to a mass flow theoretically expected for a pressure ratio, has a pronounced positive gradient over the pressure ratio, in particular in the region of small pressure ratios.

This results in considerable difficulties at the leading blade edges, in particular of the first turbine guide row. Inevitably, operation must be carried out here with a very low pressure ratio. In addition, the hot-gas-side pressure may vary considerably due to slight displacements of the stagnation point of the incident flow. The consequence is the potential risk of a pronounced reduction in the cooling-air mass flow: this leads to component overheating in the region around the stagnation point, and thus to a pronounced reduction in the useful life of the component. Similarly low pressure ratios are also to be found, for example, at the cooling-air outflow at platform edges.

A common approach to the improvement of the cooling effect in film cooling is to configure the cooling passages as diffusers. Thus, U.S. Pat. No. 3,527,543 already specifies passages which expand continuously in the direction of flow of the cooling medium at an angle of 4° to 12° in order to reduce the cooling-medium velocity at the surface to be cooled and thus ensure a uniform distribution of the cooling medium over the component surface.

Furthermore, EP 0 648 918 B1 discloses cooling passages having a diffuser-shaped discharge cross section, the diffuser having a pair of surfaces opposite one another in the direction of flow, and the edge situated downstream curving away from the other in the direction of flow. In summary, the passage geometry specified there can be characterized such that a diffuser of rectangular cross section adjoins a passage section of round cross section, the diffuser of rectangular cross section opening out at the surface to be cooled. This achieves the effect that, inter alia, the undesirable velocity component of the discharging cooling medium normal to the component surface is reduced.

It remains to be stated that a multiplicity of cooling passages, the diameter of which ranges typically in the order of magnitude from a few tenths of a millimeter up to slightly more than 1 millimeter, are to be made in a component to be cooled, and that, especially if a defined diffuser effect is aimed at, a very high production accuracy is to be demanded. It furthermore remains to be stated that the diffuser geometry in the case of pure film cooling has considerable advantages, in which case the better wetting of the component surface with the cooling medium could be mentioned in the first place. It also remains to be stated that the better tangential application of the cooling medium, as outlined above, is unable to develop any significant effect in the immediate vicinity of the stagnation points of the hot-gas incident flow, but rather that the considerable task at these locations is to ensure that the cooling-medium mass flow, at a small pressure ratio, deviates as little as possible from the design mass flow.

This is because, in the case of the showerhead cooling outlined above, the reduction in the surface temperature by a cooling film which as far as possible comes into contact is not the primary aim, but rather the primary aim is to draw off the heat from the material as effectively as possible by means of the cooling medium flowing through the passages, for which reason purely cylindrical cooling passages are still the means selected in the stagnation-point regions of the components—thus, for example, at the leading blade edges or at platform edges. In order to ensure the design mass flow of cooling medium, the throughflow passages have so far been produced by a complicated process: the manufacturer is first of all given specifications for the cross section of the cooling passages which is to be produced. The component with the cooling passages made in it is then measured by virtue of the fact that the mass flow fed through at various pressure ratios is measured. If this mass flow deviates from the design mass flow, a new diameter of the passages is determined, and the component is reworked. This process may be repeated several times, until the mass flow of the cooling medium corresponds to the requisite mass flow. This results in a costly and time-consuming manufacturing process, one aim of the invention being to significantly shorten and simplify this manufacturing process and thus save, in particular, considerable costs.

Cooling holes whose throughflow behavior is less dependent on deviations from the design point also considerably increase the operational safety of a thermally highly loaded component and thus considerably increase the availability of a technical system whose essential part is this component.

SUMMARY OF THE INVENTION

Accordingly, one object of the invention, in a component which can be subjected to high thermal loading and to which a hot-gas flow is admitted during operation, which component has at least one hot-gas side exposed to the hot-gas flow and a cold-gas side not exposed to the hot-gas flow, in which component passages are made, which passages connect the hot-gas side and the cold-gas side in such a way that a cooling medium flows from the cold-gas side to the hot-gas side, which cooling medium, when passing through a passage, absorbs heat from the component and draws it off to the hot-gas side, at least one of the cooling passages having an essentially circular cross section over its entire length (depth), which cross section increases continuously from the cold-gas side to the hot-gas side, an opening half angle being enclosed, so that the at least one passage appears frustoconical, is to specify at least one cooling passage in such a way that its throughflow behavior depends as little as possible on the prevailing pressure ratio and production tolerances, and its geometry is created in such a way that even a large number of such passages can be produced at minimum cost.

According to the invention, this is achieved in that the opening half angle of the at least one cooling passage is essentially constant over the entire passage depth (length), that the opening half angle is between 0.2° and 2.50°, and that the cross-sectional ratio of an orifice of the cooling passage on the hot-gas side and an orifice on the cold-gas side is less than 1.2.

The essence of the invention, in a component which can be used in hot-gas flows, is thus to specify, in regions which are cooled by so-called "showerhead cooling", the geometry of the cooling passages in such a way that sufficient cooling is ensured under all circumstances, the cooling passages permitting as simple a manufacturing process as possible on account of the large number required. This is achieved by the cooling passages being designed to diverge slightly in the throughflow direction. The desired aim, according to the invention, is already achieved at extremely small passage divergences. On the other hand, a passage divergence within the range which is normally realized in film-cooling passages is already unfavorable, since in the present case a pronounced diffuser effect tends to be negative.

Furthermore, a method with which the passages according to the invention can be produced in a single machining step when utilizing common production techniques is to be specified.

Cooling passages which widen slightly in the throughflow direction, specifically with a substantially smaller opening angle and a smaller area ratio than would be necessary to achieve the effects aimed at in U.S. Pat. No. 3,527,543 and EP 0 648 918 B1, are thus essentially proposed.

The most recent experimental tests show that, in the case of a conical passage, the flow coefficient is virtually constant over the pressure ratio. In this case, the passage divergence is of secondary importance, for which reason comparatively large production tolerances may be tolerated. The diffuser effect—which of course occurs to a slight extent—is of secondary importance in the case of the slight passage divergences and area ratios and otherwise does not affect the essence of the invention.

Conical cooling passages of circular cross section can be produced in an especially simple manner if the opening angle is constant over the entire passage depth. In this case, the fact that there is in any case a focused and thus convergent/divergent beam path during production by laser drilling may be utilized. The conical cooling passage is produced by a focused laser beam of high power being applied to the component from the side to be cooled, the focal point of which laser beam lies further below the component surface to be cooled than the material thickness to be penetrated.

As already indicated above, the most recent experimental tests have shown that the throughflow behavior of the conical passages, even at slight conicity, depends only very marginally on the special geometry. This again clearly simplifies the production by means of the method specified above, since, on the one hand, quite large tolerances with regard to the divergence of a cooling passage are possible without restrictions in the function. Furthermore, the geometry of the passage to be produced may be oriented to the manufacturing process within quite large limits.

It proves to be favorable if the discharge cross section of the cooling passage is less than 120% of the inlet cross section, this on the one hand for production reasons, so that the variation in the power density of the cutting beam over the material thickness to be penetrated is kept within practible limits, and in order not to require too short a focal width of the collimating optics used. It should also be considered in conjunction with this that the opening half angle of the hollow cone produced should not exceed 2.5°, which furthermore also serves to avoid excessive deceleration of the cooling flow, associated with possible separation phenomena of the cooling flow in the passage, which separation phenomena would be extremely counterproductive in particular in the "showerhead cooling".

In connection with production aspects of the invention, it may also be noted that a circular passage cross section is certainly aimed at; however, deviations, caused by production, up to an ellipse or oval shape or "milled-out portions" of the hole margins may also be tolerated within a wide range without restrictions in the function.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
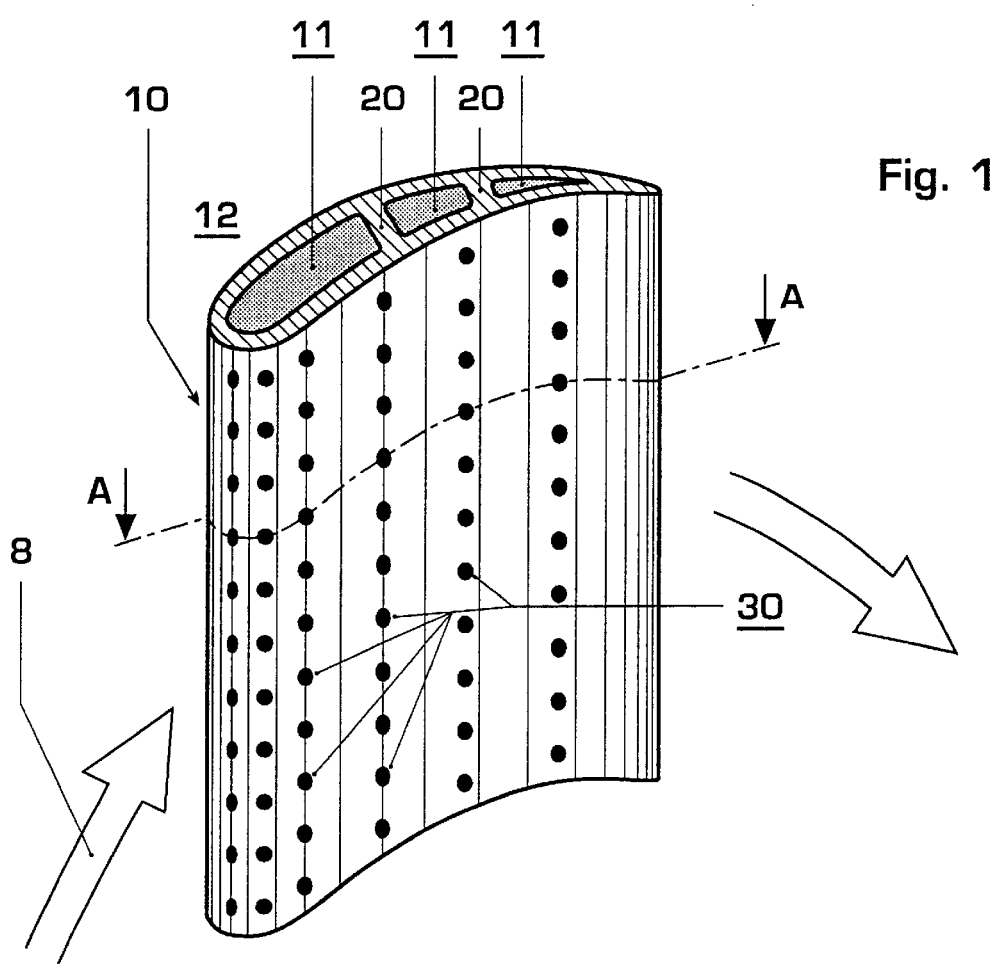
FIG. 1 shows part of a cooled turbine blade.

Referring now to the drawings, wherein like reference numerals designate identical or corresponding parts throughout the several views, the invention is illustrated with reference to a cooled turbine blade. However, this is not to be understood in a restrictive sense, since the person skilled in the art, instead of applying the invention to a component around which hot gas flows, can readily apply it to components to which hot gas is admitted only on one side, such as, for example, combustion-chamber segments.

FIG. 1 shows an example for the configuration of a cooled turbine blade 10, which is subjected to flow in the direction of the arrows. The blade contains cavities 11, which are separated from one another by webs 20. The discharge openings of the cooling passages 30 can be seen on the outside of the blade. Cooling medium is to discharge from the cavities 11 through these discharge openings and if possible flow off along the blade surface and thus insulate the blade from the hot gas in the exterior space 12.

Figure 2:
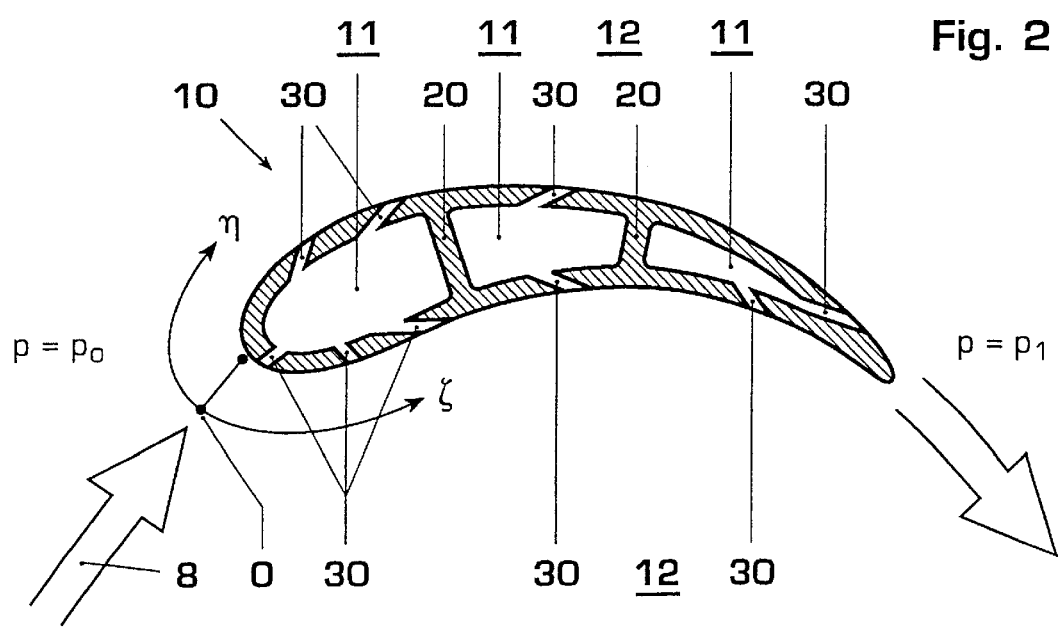
FIG. 2 shows a cross section of this blade.

FIG. 2 shows a cross section through a cooled blade. The blade is subjected to flow in the direction of the arrow identified by 8. The static pressure upstream of the blade is $p_0$, and the static pressure downstream of the blade is $p_1$. If the this blade is fitted in a first guide row of a turbine, $p_0$ corresponds to the final compressor pressure, reduced by the dynamic pressure of the incident blade flow and the pressure losses of the combustion chamber. The stagnation point of the incident flow on the blade is located at point 0. ζ and η are coordinates, with the origin at 0, which run along the blade surface on the pressure side and suction side respectively.

Figure 3:
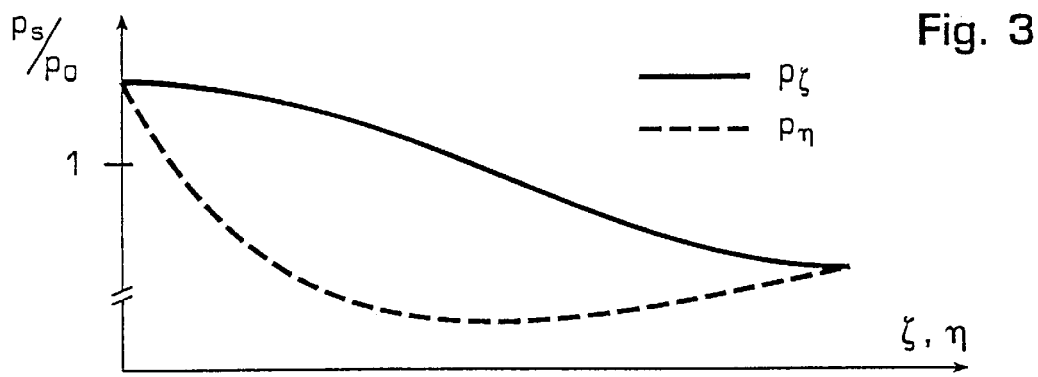
FIG. 3 shows the pressure distribution on the blade surface along the suction side and the pressure side respectively.

The basic pressure profile on the blade surface along the coordinates ζ and η is shown in FIG. 3, the pressure being normalized to the static pressure $p_0$ of the incident flow. The increase in the static pressure at the stagnation point of the blade can be recognized. Since compressor air is normally used as the cooling medium, a very small pressure difference across the cooling passages 30 results in the region of the stagnation point precisely in the case of a blade of a first turbine guide row. Very similar conditions are so to be found at the outflow in the region of the platform edges.

FIGS. 4A to 5B show the region of a cooling passage 30 in detail. The pressure $p_t$ and the temperature $T_t$ prevail in the blade interior 11, and the pressure $p_s$ and the temperature $T_s$ prevail outside the blade. An air flow 35 is to flow out of the blade interior space 11 through the cooling passage 30 and is to settle as a cooling film upon the blade surface 14.

In addition, the flow coefficient $c_d$ of the cooling passage 30 is shown in each case as a function of the pressure ratio $p_t/p_s$. This flow coefficient represents the ratio of a mass flow actually existing and a mass flow theoretically determined for a pressure ratio.

Figure 4A:
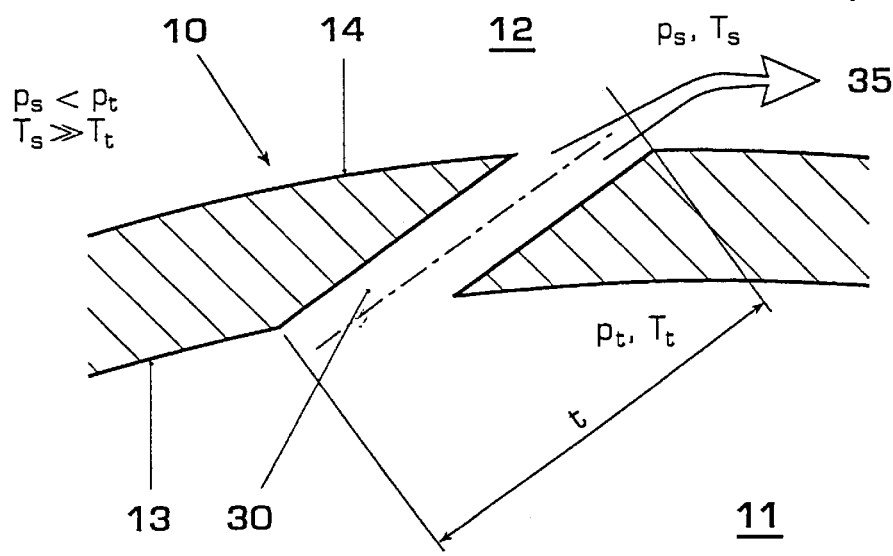
FIG. 4A shows a detail view of a cooling passage of constant cross section.
Figure 4B:
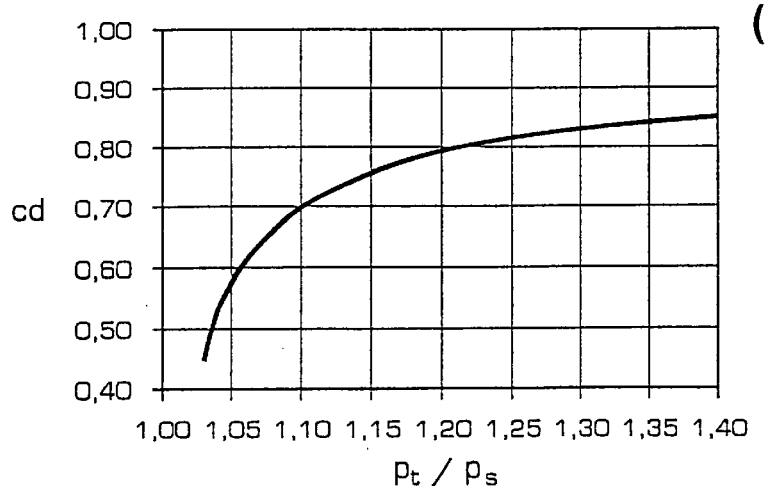
FIG. 4B shows the flow coefficient as a function of the pressure ratio over the passage illustrated in FIG. 4A.

In the case of a cooling passage, shown in FIG. 4A, having a constant circular cross section, the flow coefficient, especially at small pressure ratios, is greatly dependent on the pressure ratio. As explained above, very small pressure ratios exist especially in the region of the leading blade edge. A slight change in the incident flow and an associated change in the position of the stagnation point thus result in an overproportional change in the cooling-air mass flow.

Figure 5A:
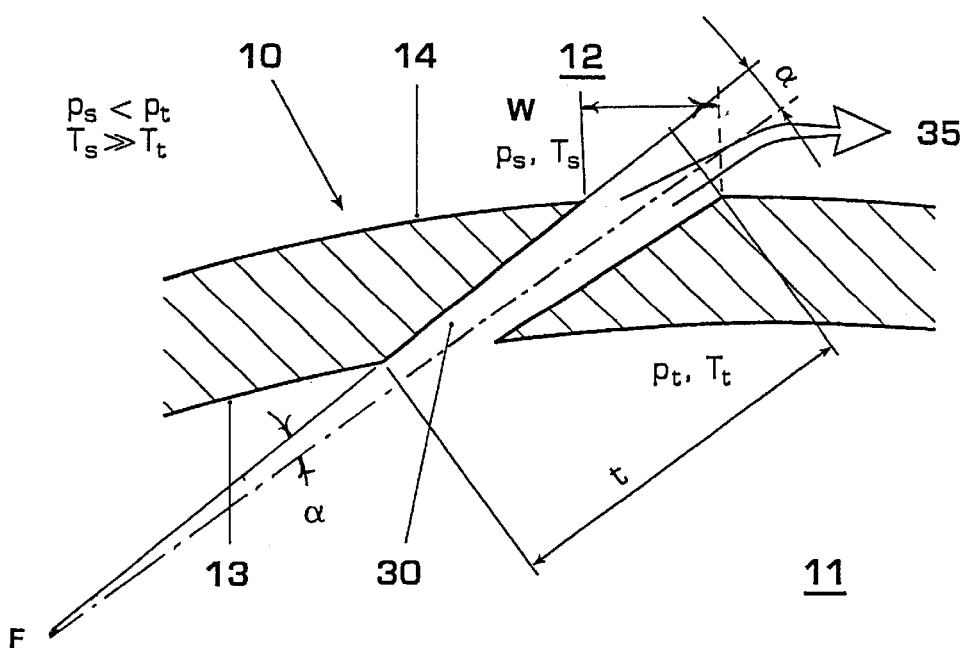
FIG. 5A shows a detail view of a conical cooling passage.
Figure 5B:
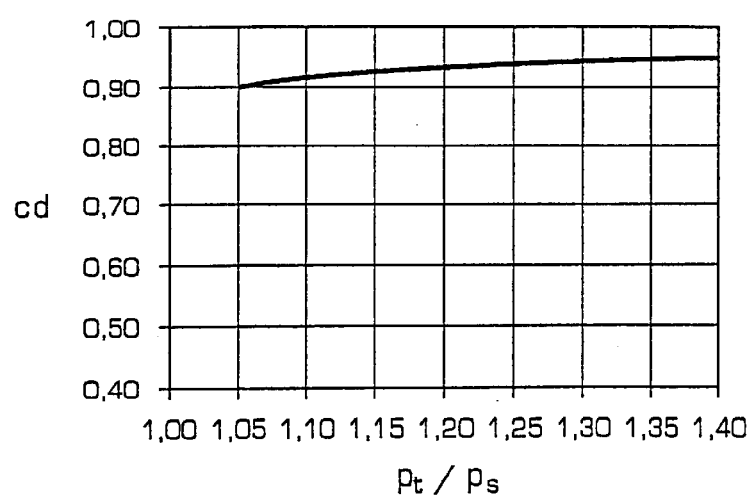
FIG. 5B shows the flow coefficient of a conical cooling passage as a function of the pressure ratio.
Figure 6:
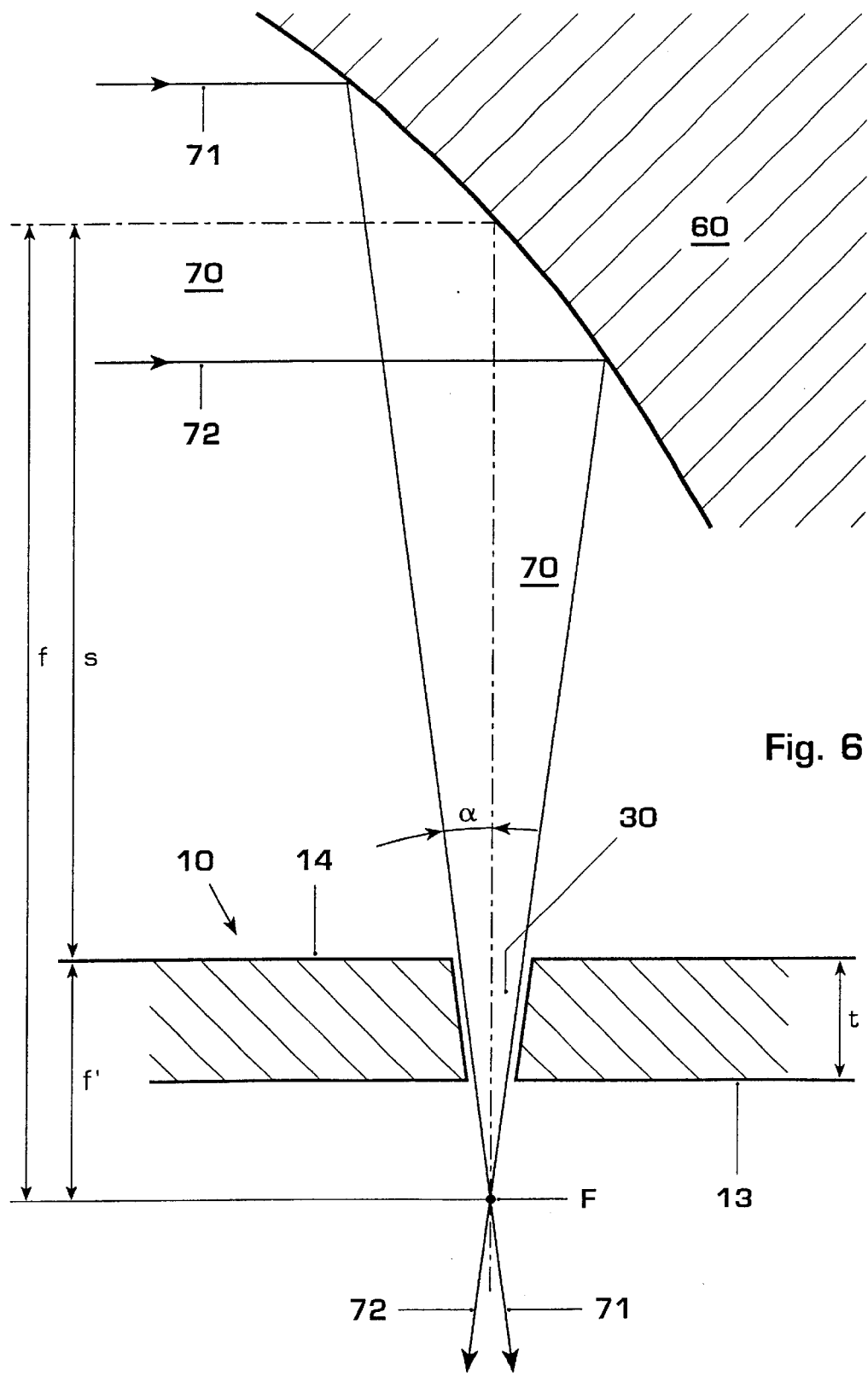
FIG. 6 shows a method of producing conical cooling passages with a high-power cutting laser.

The cooling passage shown in FIG. 5A exhibits a cross section increasing from the cold-gas side 13 to the hot-gas side 14 and having a width W and a constant opening half angle α taken from a point F (see also FIG. 6). As shown by the experimental data presented, the flow coefficient is clearly less dependent on the pressure ratio $p_t/p_s$.

Conical cooling passages having a circular cross section may be produced by laser drilling without increased production expenditure being necessary compared with cylindrical holes. The production of a conical passage 30 by a cutting laser (not depicted) is schematically shown in FIG. 6. The cutting beam 70 is delineated by its marginal beams 71, 72. In general, the beam of a high-power laser is directed in an expanded manner. This beam must be projected by optics to a smaller diameter in order to obtain the power density necessary for the machining. The expanded beam 70 enters from the left in the arrow direction and strikes focusing optics, represented by a mirror 60 in the example. The fitting of further components such as, for example, diaphragms in the beam path, or the replacement of the single mirror shown in the example by a mirror system or by lenses, is irrelevant in this context.

Resulting from the requisite beam collimation is a convergent beam having the focal point F, which encloses the half angle α. If a parallel or approximately parallel hole is now to be produced, further optical components are necessary in order to obtain a cutting beam of negligible convergence or divergence. In the method of producing conical cooling-air holes, the focal distance f of the focusing optics 60 is selected in such a way that the cutting beam 70 encloses the desired half angle α and strikes the workplace 10 with precisely this cutting geometry. Depending on whether the distance s between collimating optics 60 and workplace surface 14 is greater or smaller than the focal distance f of the collimating optics and on whether in the latter case the distance f' of the focal point F from the workplace surface 14 is greater or smaller than the material thickness or depth t to be penetrated, different cross-sectional profiles of the hole are produced. In the exemplary embodiment, the surface 14 of the workplace 10 is the hot-gas side. In this case, in order to produce the cooling passages according to the invention, the distance s between workplace surface 14 and collimating optics 60 is selected to be smaller than the focal distance f of the collimating optics by at least the material thickness t to be penetrated. In this way, the desired cross-sectional profile of the hole 30 is produced in one working step.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A component which can be subjected to high thermal loading and to which a hot-gas flow can be admitted during operation, the component comprising:

at least one hot-gas side for exposure to the hot-gas flow and a cold-gas side not for exposure to the hot-gas flow;

component cooling passages connecting the hot-gas side and the cold-gas side so that when a cooling medium flows from the cold-gas side to the hot-gas side, the cooling medium, when passing through a component passage, absorbs heat from the component and draws off the heat to the hot-gas side;

wherein at least one of the component cooling passages has a length, a hot-side orifice, a cold-side orifice, and a circular cross section over the entire length of the at least one component cooling passage, which cross section increases continuously from the cold-gas side to the hot-gas side, the at least one component cooling passage enclosing an opening half angle so that the at least one component cooling passage is frustoconical;

wherein the opening half angle of the at least one component cooling passage is essentially constant over the length of the passage;

wherein the opening half angle is between 0.2° and 2.5°; and wherein a ratio of the cross-sectional area of the hot-side orifice of the at least one component cooling passage to the cross-sectional area of the cold-side orifice of the at least one component cooling passage is less than 1.2.

* * * * *